United States Patent [19]

Martelli

[11] 4,194,442

[45] Mar. 25, 1980

[54] DEVICE FOR PICKING UP SEMI-RIGID SHEET-LIKE ELEMENTS FROM A MAGAZINE AND TRANSFERRING THEM ONTO A CONVEYOR

[76] Inventor: Guglielmo Martelli, Via Gaibola, 13/3, Bologna, Italy

[21] Appl. No.: 888,044

[22] Filed: Mar. 16, 1978

[30] Foreign Application Priority Data

Mar. 18, 1977 [IT] Italy ........................ 3374 A/77

[51] Int. Cl.[2] ........................ B65G 59/06

[52] U.S. Cl. ........................ 93/53 SD; 271/95; 414/128; 414/137

[58] Field of Search ............ 214/8.5 D, 8.5 C, 1 BV, 214/1 BH; 93/53 SD; 53/564, 567; 271/11, 91, 95; 198/480; 414/121, 128, 737, 744

[56] References Cited

U.S. PATENT DOCUMENTS

| | | | |
|---|---|---|---|
| 2,936,681 | 5/1960 | Earp | 53/564 X |
| 3,386,558 | 6/1968 | Benatar | 214/1 BV X |

*Primary Examiner*—Stephen G. Kunin
*Assistant Examiner*—George F. Abraham
*Attorney, Agent, or Firm*—Guido Modiano; Albert Josif

[57] ABSTRACT

A device for picking up semirigid sheet-like elements from a magazine comprises a rotating body supported by a horizontal and fixed shaft supporting a radial cam and at least one arm oscillating in a plane normal to the shaft and serving as a radial guide for a gripping member and gears effective to displace the gripping member between a position spaced from the magazine and a position near to it for picking up sheet-like elements.

2 Claims, 3 Drawing Figures

DEVICE FOR PICKING UP SEMI-RIGID SHEET-LIKE ELEMENTS FROM A MAGAZINE AND TRANSFERRING THEM ONTO A CONVEYOR

BACKGROUND OF THE INVENTION

This invention relates to a device for picking up semi-rigid sheet-like elements from a magazine and transferring them onto a conveyor. The invention is specially useful for picking up and opening closed or flattened cases or containers in packaging systems. It is known that in the container field for product packaging use is made of cases which are picked up at intervals from a fixed magazine wherein they are contained in stacked arrangements.

In order to extract such cases from the magazine, various approaches have been proposed which comprise a wheel mounted for rotation about a horizontal axis and carrying gripping members arranged peripherally, which are effective to retain the cases that are individually picked up from the magazine and transferred onto the wheel by auxiliary means.

Such auxiliary means usually consists of reciprocating suckers or pushers which withdraw the front case from the magazine and bring it into the gripping means range, such means then releasing it onto a conveyor after performing a given rotation. In the prior art apparatus, the cases are either opened during said rotation or as they are delivered to the conveyor.

Prior art apparatus are affected by substantial shortcomings. First of all, owing to the relative speed between the wheel and magazine, it is somewhat difficult to achieve good accuracy in picking up and positioning the cases onto the gripping means. Secondly, the cases are opened by applying suitable pressure forces to the opposite edges of the closed cases or, alternatively, by means of pushers which compress the folds which make up the case. These shortcomings, in actual practice, reflect in an appreciable limitation to the rate of production of prior art apparata, as well as in faulty and unreliable opening of the cases, and especially so when the latter are of a material of square section exhibiting poor rigidity.

SUMMARY OF THE INVENTION

It is a primary object of this invention to provide a device, which enables a relative speed equal to zero to be obtained between the magazine and the gripping means, thereby the latter can also be used during the step of picking up the cases from the magazine.

This object is achieved by a device for picking up semirigid sheet-like elements from a magazine, according to this invention, characterized in that it comprises a rotating body driven of continuous motion and supported by a normally horizontal and fixed shaft, a radial cam mounted on said shaft and fixed with respect to said rotating body, at least one arm mounted on said shaft for oscillation in a plane normal thereto and serving as a radial guide for an attaching block of a gripping member for the sheet-like elements contained in the magazine, a planet gear carried idly by said arm and provided with an eccentric pin for engagement with said radial cam, said planet gear meshing with a gear segment rigid with said rotating body and concentrical to said shaft, and a cam provided on said rotating body at said gear segment and being engaged by a pin projecting from said block for defining the displacement of the block between a position wherein the gripping member is spaced apart from the magazine and a position wherein said gripping member is approached thereto to pick up said sheet-like elements, said radial cam being contoured such as to cause an advanced oscillatory movement of said arm prior to the latter reaching the magazine and the stopping of said arm with respect to the magazine when the gripping member is in its position of sheet-like element picking up.

BRIEF DESCRIPTION OF THE DRAWINGS

Further features and advantages of this invention will become apparent from the following detailed description of a preferred but not restrictive embodiment thereof, illustrated by way of example in the accompanying drawings, where.

DESCRIPTION OF THE PREFERRED EMBODIMENTS

Figure 1:
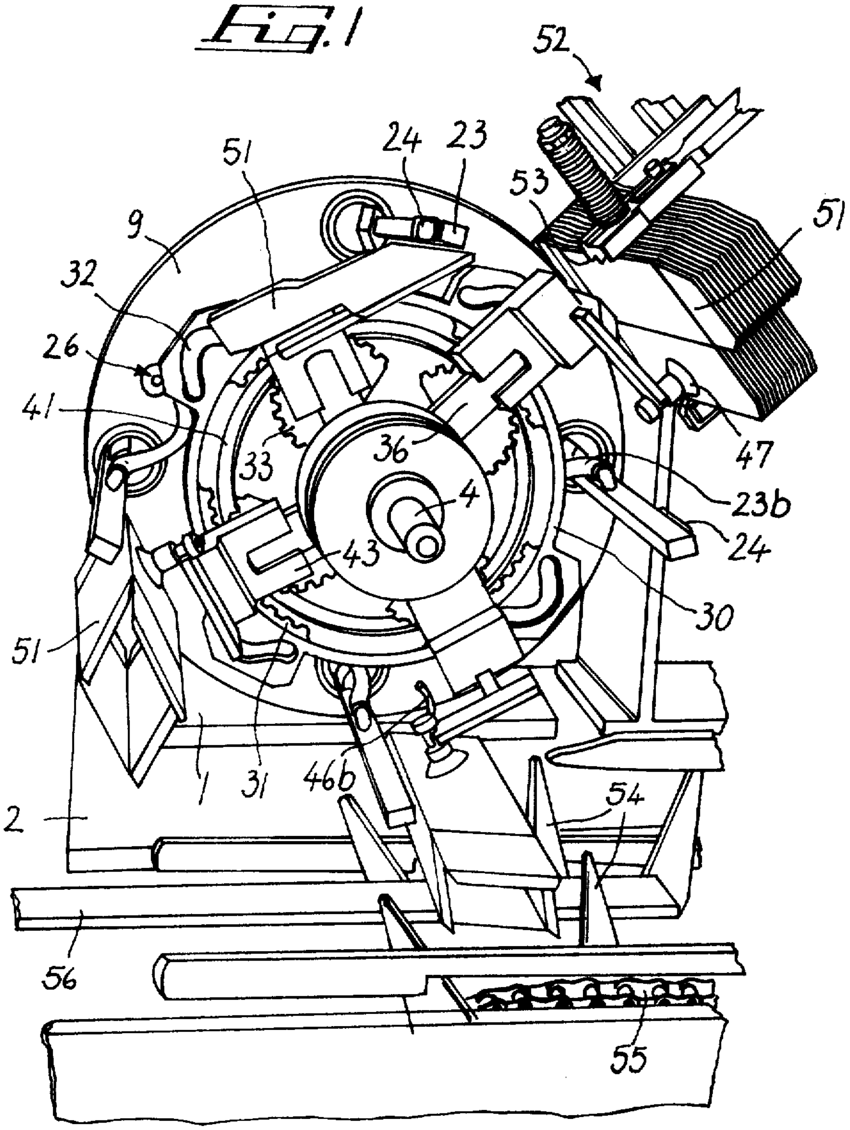
FIG. 1 is a perspective view of the device according to this invention.
Figure 2:
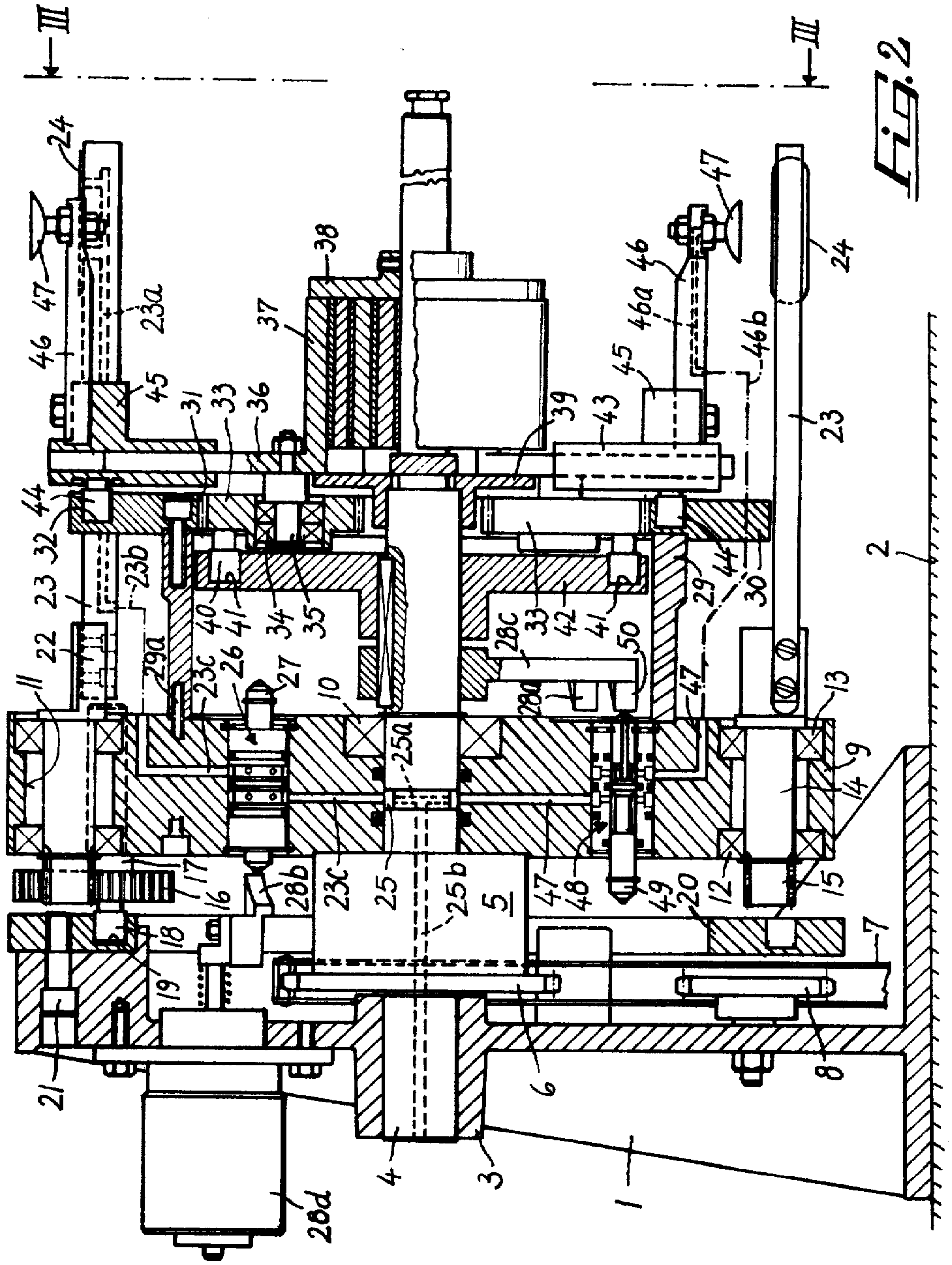
FIG. 2 is a longitudinal elevation section through the device of FIG. 1.

Making reference to the cited figures, the inventive device comprises a shoulder element, generally indicated at 1, fixed on a base 2 wherefrom it extends vertically. The shoulder element 1 has a sleeve 3, wherein is supported a shaft 4 which projects horizontally cantilever-like. The shaft 4 carries pivotally a hub 5, whereto is flange-attached a sprocket wheel 6 meshing with a drive chain 7, also passed around a sprocket 8, carried idle on the shoulder element 1 and projecting therefrom. The chain 7 is set in motion by a means, not shown, contained in the base 2, which are effective to drive the hub 5 of continuous rotary motion.

On the hub 5, there is centered and rigidly mounted for rotation therewith a body 9 in the shape of a disc of appreciable thickness. The body 9 is supported by the shaft 4 through a bearing 10 and is provided along its peripheral area, with four seats 11 which are arranged offset at 90° from each other. The seats 11 pivotally support, with the interposition of bearings 12,13, small shafts 14, which are provided with teeth 15 at their ends facing the shoulder element 1.

It should be remarked here that in the rest of this description, in order to avoid obvious repetitions, elements and parts which are of similar construction will be denoted with the same reference numerals.

In the proximity of the small shafts 14, there are pivotally supported gear segments 16 in mesh engagement with the toothed ends of the shafts 14. The gear segments 16 have a substantially triangular configuration, their supporting axis to the body 9 being represented by a centrally located pin 17. The apex end of each gear segment is provided with a roller 18 engaging a slot 19 formed in a washer 20 attached to the shoulder element 1 by means of bolts 21. The slot 19 constitutes a control cam for the oscillatory movement of the gear segments 16. In this way, the small shafts 14 are imparted a rotation of a desired extent and direction, as will be explained hereinafter.

A bracket 22 is rigid with the ends of the shafts 14 remote from the toothed ends 15, whereto is secured an arm 23 which carries a sucker 24 at its end. The sucker 24 is connected, through a duct 23*a* internal to the arm 23 and a flexible tube schematically represented in the drawing by the dash-and-dot line 23b, to a canalization 23c formed in the body 9 and communicating to an annular groove 25 of the shaft 4. From the groove 25, there extends a bore through the shaft 4 comprising a first radial section 25a and a second axial section 25b which ends open at the left end of the shaft 4. The bore 25b is connected to a suction pump, not shown, operative to evacuate the sucker 24 through the canalization 23c and tube 23b, and to enable withdrawal and retention onto the sucker 24 of a case picked up from a magazine, as explained hereinafter.

In order to activate and deactivate the sucker 24 in a correctly timed relationship, provision is made for a valve 26 arranged along the canalisation 23c and driven between positions of canalisation 23c shut and opened. The valve 26 comprises a shutter 27 which is driven between said shut and open positions by means of a pair of detents 28a and 28b, which are angularly offset with respect to the shaft 4. The detent 28a is stationary and secured to a lever 28c rigid with the shaft 4 for rotation therewith. The detent 28b is instead movable by a solenoid 28d, flange mounted to the shoulder element 1, between a position of engagement with the shutter 27 and one of disengagement therefrom. The solenoid 28d is controlled by a sensing member effective to monitor the demand for cases and their picking from the magazine. In actual operation, said sensing member, lacking a demand for cases, controls the solenoid to bring the detent 28b to the position of disengagement of the shutter 27, thereby the shutter 27, once moved to the position in which the canalization 23c is shut by the abutment on the detent 28a, the detent is held in that position due to the lacking of the detent 28b. Thus, the sucker 24 remains deactivated and no cases are picked up from the magazine. A drum 29, secured by studs 29a, is center mounted to the body 9 co-axially with the shaft 4. To the drum 29, a plate 30 is attached frontally having substantially the shape of an annulus.

On the inner contour of the plate 30, there are formed four gear segments 31, while on the outer contour thereof, at said gear segments, respective cams 32 are formed. Such cams 32 have a substantially sinusoidal profile, with a first portion 32a which extends from the inside to the outside, and a portion 32b which extends inwardly from the outer end of the portion 32a.

Respective planet gears 33 engage with the gear segments 31 which are configurated as gear segments extending over more than a half-circle. The planet gears 33 are supported, with the interposition of bearings 34, by pins 35 projecting from respective radial arms 36. Each arm 36 is rigid with a sleeve 37 concentrical with the shaft 4. The sleeves 37 of the various arms are supported one within the other and retained on the shaft 4 between a plate 38 and a plate 39. The planet gears 33 carry, at a concentrical position, a pin 40 which engages in a slot 41 of a cam 42 rotatively rigid with the shaft 4. The slot 41 has a pattern, which, as visible in FIG. 3, comprises a truly circular portion indicated at 41a, a second portion 41b having a radius of curvature progressively decreasing from the periphery to the center, and finally a third portion 41c which follows a substantially radial and arcuate pattern, such as to merge with the first portion 41a.

Slidable along arms 36, are blocks or sleeves 43 which, on their sides facing the plate 30, carry pins 44 in engagement inside the cams 32. On their opposed sides, the sleeves 43 are provided with brackets 45 whereto are affixed stems 46 which carry, at their free ends, outward extending suckers 47.

Again, the suckers 47, similar to the suckers 24, are connected through ducts 46a of the stems 46 and flexible tubes 46b, shown in dash-and-dot lines, to respective ducts 47 formed in the body 9 and controlled by valves 48 and adapted to assume two operative positions. In fact, each valve 48, entirely similar to the cited valves 26, comprises a shutter 49 controlled for actuation by a stationary detent 50, rigid with the lever 28c, and a movable detent, not shown, which may be actuated between a stopping position and a releasing one by means of a solenoid similar to cited one, denoted with the reference numeral 28d.

The operation of the inventive device is as follows. It is assumed that cases 51, stacked in a magazine 52 and retained therein by sort of claws 53 which engage the opposed ends or edges of such cases, are to be singly picked up. Also assumed is that the arms illustrated in FIG. 3 correspond to four operative positions, offset at 90°, of one and the same arm 36. In this situation, starting from the position indicated at A, as the hub 5 is rotated by the chain 7, the body 9 is caused to move in the direction of the arrowhead f. Hence, owing to the gear segments 31 engaging the planet gears 33, mutually locked and owing to the pins 40 forcibly engaging the slot 41 preventing the planet gears 33 from rotating, the arms 36 are also rotated. As the pin 40 of the arm 36 under consideration starts along the portion 41b of the slot 41, the planet gear 33 is imparted an advanced oscillatory movement, thereby the related arm 36 leans forward with respect to the direction of rotation f. At the position of maximum advance of the arm 36, indicated at B in FIG. 3, the pin 40 is located past the top of the apex formed by the portions 32a, 32b. Hence the sleeve 43 will have completed a radially outward stroke followed by a slight retraction, as determined by the portion 32b.

At the position of maximum advance of the arm 36, the pin 40 is ready to start along the portion 41c of the slot 41, thereby, owing to the planet gear 33 meshing with the gear segment 31, the arm 36 performs a reverse rotation with respect to the plate 30. The profile of the portion 41c is selected such that between the arm 36 and the magazine there is no relative speed. While the pin 40 completes its travel along the portion 41c, the pin 44 follows the slot 32 in the reverse direction. Thus, there will occur a further outward displacement of the sleeve 43 along the portion 32b until the sucker 47 comes into contact with the front case 51 of the stack contained in the magazine 52. In that position of contact, the arm 36 is approximately aligned with the dash-and-dot line C.

Once contact between the sucker 47 and case 51 has been established, connection is made between the sucker and suction pump, thereby the case remains attached to the sucker. As the plate 30 rotates further with respect to the arm 36, the pin 44 completes the portion 32a of the cam 32 to cause the withdrawal of the sleeve 43 and, accordingly, the picking up of the case from the magazine. As the pin 44 reaches the innermost point of the slot 32, the pin 40 has already been started along the portion 41a of the slot 41, thereby a rigid coupling is established between the planet gear 33 and, hence, the arm 36 and plate 30. This coupling is maintained throughout the remaining angle of rotation included between the positions C and A.

Figure 3:
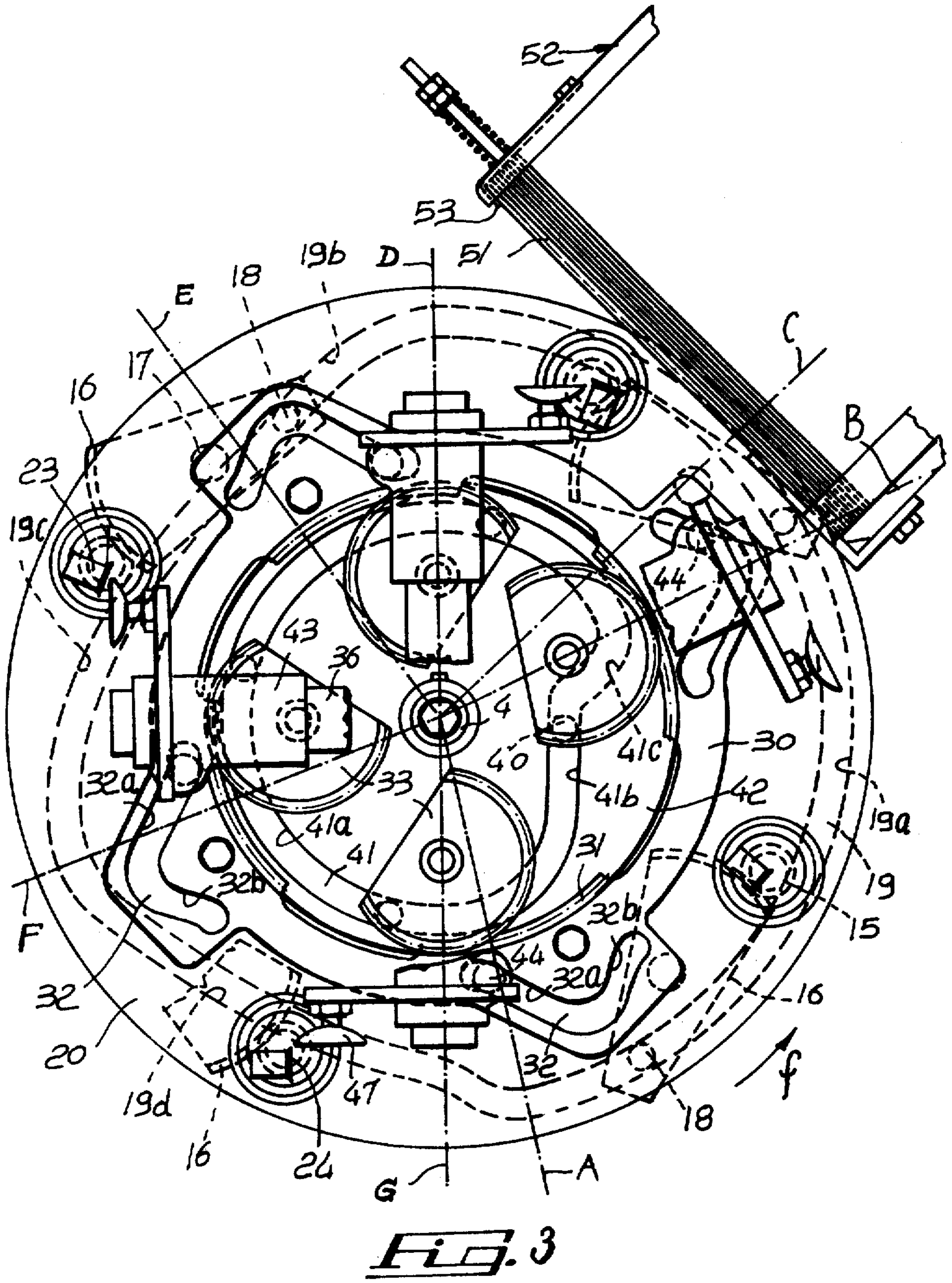
FIG. 3 is an axial view taken along the line III—III of FIG. 2.

During the rotation of the cam 36 from a position immediately following the one indicated at A in FIG. 3 to the diametrically opposed position, indicated at D, the sucker 24 is held absolutely stationary. In fact, between A and C, the cam 19 presents a portion 19*a* which is perfectly concentrical to the shaft 4, thereby the pin 18, engaging that portion, undergoes no radial displacement capable of producing oscillation of the gear segment 16 and, therefore, rotation of the shaft 14 and sucker 24 which is suitably held at a height level below a plane through the edge of the sucker 27, in order to avoid interference with the picked up case. From the position D, the cam 19 proceeds with a portion 19*b* having decreasing radius and extending through about 30° as far as the position E. Along this portion, there occurs a rotation through over 180° of the shaft 14, and hence the tilting of the sucker 24 onto the outer face of the case 51 held by the sucker 47. It should be noted that the rotation axis of the sucker 24, i.e. the axis of the shaft 14, is coincident with that folding edge of the case which is at the rear with respect to the direction of rotation f and along which two adjacent folds of the case are brought into contact, one over the other.

Said rotation axis lies in the plane passing through the edge of the sucker 47, and its coincidence with the case folding edge is obtained by adjusting the pick up position of the sucker 47, namely the position C, wherein the arm 36 has zero speed with respect to the magazine. At the position E, there occurs the activation of the sucker 24, by connection to the suction pump, and between the position E and following position F, wherein the cam 19 comprises a portion 19*c* of progressively increasing radius, the sucker 24 is tilted backwards.

The tilting of the sucker 24 produces rotation of the fold held thereby about the corner edge coinciding with the axis of the shaft 14, and the opening or unfolding of the case. The sucker 24 is rotated backwardly by an angle of about 180°, such as to fold the case in the opposite direction along the other two diagonally opposed edges. In this manner, any tendency of the case to fold down upon itself is effectively counteracted.

Between the positions F and A, the cam 19 presents a portion 19*d* comprising a first portion of decreasing radius and a second portion of increasing radius. During its travel along the first portion, the sucker 24 assumes an attitude of 90° with respect to the sucker 47 which allows the case to retain a substantially parallelepipedal configuration. With this attitude, the case 51 is introduced into a housing defined between pairs of pushers 54 arranged radially on a chain conveyor 55 of conventional design, which pushers are operative to push the case along a flow or sliding surface 56.

When a case is positioned between a pusher pair, at approximately the position C, the suckers 47,24 are deactivated to allow release of the case into its related housing on the conveyor, and the transfer thereof to the utilization stations.

Obviously, the described movements, while referred to a single arm 36, are followed cyclically by the other arms, such that all of the housings on the conveyor are filled in succession with cases fed by the device.

The invention as described fully achieves its objects. In particular, the nullification of the relative speed between the pick up sucker 47 and magazine 52 affords a perfect extraction of the cases. Furthermore, the positive opening of the cases by the suckers 24 avoids those drawbacks to be found in prior art apparatus and due to insufficient rigidity of the sheet-like material being employed and to the tendency of the flattened cases to fold into an "L" shape, especially when such cases have a square cross section and are opened by means of pushers or fixed or movable detents.

The instant device is particularly useful for opening cases of large size, wherein to the above drawbacks, there adds the necessity of operating within time limits such as to allow air to penetrate inside the case during the opening step.

I claim:

1. A device for picking up semirigid sheet-like elements from a magazine, characterized in that it comprises a rotating body driven of continuous motion and supported by a normally horizontal and fixed shaft, a radial cam mounted on said shaft and fixed with respect to said rotating body, at least one arm mounted on said shaft for oscillation in a plane normal thereto and serving as a radial guide for an attaching block of a gripping member for the sheet-like elements contained in the magazine, a planet gear carried idly by said arm and provided with an eccentric pin for engagement with said radial cam, said planet gear meshing with a gear segment rigid with said rotating body and concentrical with said shaft, and a cam provided on said rotating body at said gear segment and being engaged by a pin projecting from said block for defining the displacement of the block between a position wherein the gripping member is spaced apart from the magazine and a position wherein said gripping member is approached thereto to pick up said sheet-like elements, said radial cam being contoured such as to cause an advanced oscillatory movement of said arm prior to the latter reaching the magazine and the stopping of said arm with respect to the magazine when the gripping member is in its position of sheet-like element picking up.

2. A device for picking up flattened cases from a magazine and for opening the same according to claim 1, said device further comprising at least one shaft pivotally supported in said rotating body about an axis parallel to said fixed shaft and substantially coincident with a folding edge of a flattened case picked up by the gripping member, a sucker mounted on said shaft and connected to a suction pump, valve means controlling activation and deactivation of said sucker, a second stationary cam comprising a first portion to cause rotation of said shaft such as to bring the sucker onto the case face opposite that of engagement of the gripping member and a second portion to cause rotation of the shaft in the opposite direction during activation of said sucker to open said case.

* * * * *